US007018502B2

(12) United States Patent
Treleaven et al.

(10) Patent No.: US 7,018,502 B2
(45) Date of Patent: Mar. 28, 2006

(54) MULTI-PLY RESEALABLE LABEL

(75) Inventors: Carl W. Treleaven, Greensboro, NC (US); Glenn A. Grosskopf, Lake Zurich, IL (US)

(73) Assignee: Pharmagraphics (Southeast), LLC, Greensboro, NC (US)

( * ) Notice: Subject to any disclaimer, the term of this patent is extended or adjusted under 35 U.S.C. 154(b) by 288 days.

(21) Appl. No.: 10/401,922

(22) Filed: Mar. 28, 2003

(65) Prior Publication Data

US 2003/0201064 A1 Oct. 30, 2003

Related U.S. Application Data

(62) Division of application No. 09/878,091, filed on Jun. 8, 2001, now Pat. No. 6,576,315.

(60) Provisional application No. 60/211,983, filed on Jun. 16, 2000.

(51) Int. Cl.
*B32B 37/02* (2006.01)

(52) U.S. Cl. ...................... 156/269; 156/257; 156/268; 156/289; 156/301; 156/302; 283/81; 283/101; 283/106

(58) Field of Classification Search ................ 156/250, 156/267, 269, 289, 290, 291, 297, 299, 300, 156/301, 302, 257, 268; 283/81, 100, 101, 283/106, 107, 108; 428/40.1, 41.8, 42.3, 428/42.2

See application file for complete search history.

(56) References Cited

U.S. PATENT DOCUMENTS 4,153,496 A 5/1979 Swift ......................... 156/384
4,351,679 A * 9/1982 Dreher ........................ 156/70
4,421,816 A * 12/1983 Arnold ........................ 428/202
4,744,161 A 5/1988 Instance ....................... 40/2 R
5,021,273 A 6/1991 Kobayashi ................... 428/40
5,207,458 A 5/1993 Treichel et al. ............... 283/81
5,225,022 A * 7/1993 Baker et al. ................ 156/277
5,284,363 A 2/1994 Gartner et al. ................ 283/81
5,474,173 A 12/1995 Hodapp ...................... 206/232
5,588,239 A 12/1996 Anderson .................... 40/630
5,700,537 A 12/1997 Instance .................... 428/41.9
5,727,819 A 3/1998 Grosskopf et al. ............ 283/81
5,738,382 A 4/1998 Grosskopf et al. ............ 283/81
5,766,716 A 6/1998 Barry ........................ 428/40.1
5,829,789 A 11/1998 Treleaven et al. ............ 283/81
5,863,628 A 1/1999 Barry ........................ 428/40.1

(Continued)

FOREIGN PATENT DOCUMENTS

EP 0 153 185 B1 9/1991

*Primary Examiner*—Linda Gray
(74) *Attorney, Agent, or Firm*—Myers Bigel Sibley & Sajovec, P.A.

(57) ABSTRACT

A label includes a base label having upper and lower opposed surfaces and first and second opposed ends. A base adhesive coats the lower surface of the base label. A top panel overlies the upper surface of the base label and is joined to the base label adjacent the first end. The top panel has an upper surface. A tab having upper and lower opposed surfaces overlies the upper surface of the base label. An adhesive patch is interposed between the base label and the tab adjacent the second end. The adhesive patch secures the lower surface of the tab to the upper surface of the base label. A laminate cover overlies the top panel and the tab. A laminate adhesive secures the laminate cover to the upper surface of the top panel and releasably joins the laminate cover to the upper surface of the tab.

13 Claims, 8 Drawing Sheets

U.S. PATENT DOCUMENTS

| | | | | |
|---|---|---|---|---|
| 5,944,357 | A | 8/1999 | Instance | 283/101 |
| 5,975,575 | A | 11/1999 | Instance | 281/2 |
| 5,975,582 | A | 11/1999 | Treleaven | 283/81 |
| 6,057,019 | A | 5/2000 | Barry | 428/40.1 |
| 6,082,777 | A | 7/2000 | Grosskopf et al. | 283/81 |
| 6,254,137 | B1 | 7/2001 | Baum, Jr. et al. | 283/81 |
| 6,413,604 | B1 | 7/2002 | Matthews et al. | 428/40.1 |
| 6,585,437 | B1 * | 7/2003 | Wiklof et al. | 400/621 |

* cited by examiner

MULTI-PLY RESEALABLE LABEL

RELATED APPLICATIONS

This application claims priority from and is a divisional of parent application Ser. No. 09/878,091, filed Jun. 8, 2001, now U.S. Pat. No. 6,576,315, which claims the benefit of U.S. Provisional Application Ser. No. 60/211,983, filed Jun. 16, 2000. The disclosures of these applications are hereby incorporated herein by reference in their entireties.

FIELD OF THE INVENTION

The present invention relates to labels and, more particularly, to multi-ply labels.

BACKGROUND OF THE INVENTION

For many applications, the need for available label area is continually increasing. For example, the U.S. Food and Drug Administration has proposed regulations to require pharmaceutical, vitamin and nutraceutical manufacturers to include supplementary disclosure data on various over-the-counter medications sold in the U.S. At the same time, hospitals and other health organizations often need or desire to include bar code and other automatic identification indicia on products passing through the health care system. One known method for providing additional area for such indicia includes attaching folded leaflets or booklets to webs to create so-called expanded content or extended text labels. Such labels may be relatively expensive to manufacture and handle, and may not satisfy all the needs of the user.

SUMMARY OF THE INVENTION

According to embodiments of the present invention, a label includes a base label having upper and lower opposed surfaces and first and second opposed ends. A base adhesive coats the lower surface of the base label. A top panel overlies the upper surface of the base label and is joined to the base label adjacent the first end. The top panel has an upper surface. A tab having upper and lower opposed surfaces overlies the upper surface of the base label. An adhesive patch is interposed between the base label and the tab adjacent the second end. The adhesive patch secures the lower surface of the tab to the upper surface of the base label. A laminate cover overlies the top panel and the tab. A laminate adhesive secures the laminate cover to the upper surface of the top panel and releasably joins the laminate cover to the upper surface of the tab.

According to further embodiments of the present invention, a label includes a base label having upper and lower opposed surfaces and first and second opposed ends. A base adhesive coats the lower surface of the base label. A top panel overlies the upper surface of the base label and has an upper surface. The top panel and the base label are mutually discrete members. A hinge adhesive is interposed between the top panel and the base label adjacent the first end. The hinge adhesive connects the top panel and the base label to form a hinge portion. A laminate cover overlies the top panel. A laminate adhesive secures the laminate cover to the upper surface of the top panel. The laminate adhesive releasably joins the laminate cover to the upper surface of the top panel and releasably joins the laminate cover to the upper surface of the base label.

According to embodiments of the present invention, a label includes a base label having upper and lower opposed surfaces and first and second opposed ends. A base adhesive coats the lower surface of the base label. A release liner panel is joined to the base panel and has a release coated upper surface. A top panel overlies the upper surface of release liner panel. The top panel has an upper surface. An intermediate adhesive coats the release coated upper surface of the release liner panel and releasably joins the top panel to the release liner panel. A top panel tab having upper and lower opposed surfaces overlies and is connected to the upper surface of the base label. A laminate cover overlies the top panel and the top panel tab. A laminate adhesive secures the laminate cover to the upper surface of the top panel and releasably joins the laminate cover to the upper surface of the top panel tab.

According to method embodiments of the present invention, a method for forming a label includes providing a release liner and a base web releasably secured to the release liner by a base adhesive coating an inner surface of the base web. A hinge adhesive is applied to an outer surface of the base web. A top sheet is applied to the outer surface of the base web such that a portion of the top sheet is secured to the base web by the hinge adhesive. A self-adhesive laminate web is applied over the base web and the top sheet. Each of the laminate web, the top sheet and the base web is cut through to form the label, the label including a laminate cover formed from the laminate web, a top panel formed from the top sheet, and a base label formed from the base web. At least the laminate cover and the top panel are substantially coextensive.

According to further method embodiments of the present invention, a method for forming a label includes providing a release liner having a base adhesive on an outer surface thereof. A leaflet assembly is provided including a top panel and a bottom panel joined to the bottom panel along a fold. The leaflet assembly further includes a hinge adhesive coating respective inner surfaces of the top panel and the bottom panel adjacent the fold and securing the top and bottom panels to one another. The leaflet assembly is applied to the release liner such that the bottom panel is releasably secured to the release liner by the base adhesive. A self-adhesive laminate web is applied over the leaflet assembly and the release liner. Each of the laminate web, the top panel and the bottom panel is cut through to form the label. The step of cutting includes severing the fold from each of the top panel and the bottom panel.

According to method embodiments of the present invention, a method for forming a label includes providing a release liner and a base web releasably secured to the release liner by a base adhesive coating an inner surface of the base web and providing a top web. A pattern of active adhesive is provided on at least one of an inner surface of the top web and an outer surface of the base web. The pattern of active adhesive includes a hinge adhesive portion. A self-adhesive laminate web is provided. The release liner, the base web, the top web and the laminate web are married such that the top web is interposed between the base web and the laminate web. Each of the laminate web, the top web and the base web is cut through to form the label. The label includes a laminate cover formed from the laminate web, a top panel formed from the top web, and a base label formed from the base web. The hinge adhesive portion secures the top panel to the base label.

Objects of the present invention will be appreciated by those of ordinary skill in the art from a reading of the figures and the detailed description of the preferred embodiments which follow, such description being merely illustrative of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. "Upper," "lower" and like terms as used herein refer to relative positions of components. However, it will be appreciated that labels according to the invention may be formed or mounted such that the relative positions of the components are reversed or are horizontally rather than vertically aligned, in which case it will be understood that "upper," "lower" and the like describe the relative positions of the components along a selected axis (which my or may not be fully or partially vertically oriented).

Figure 1:
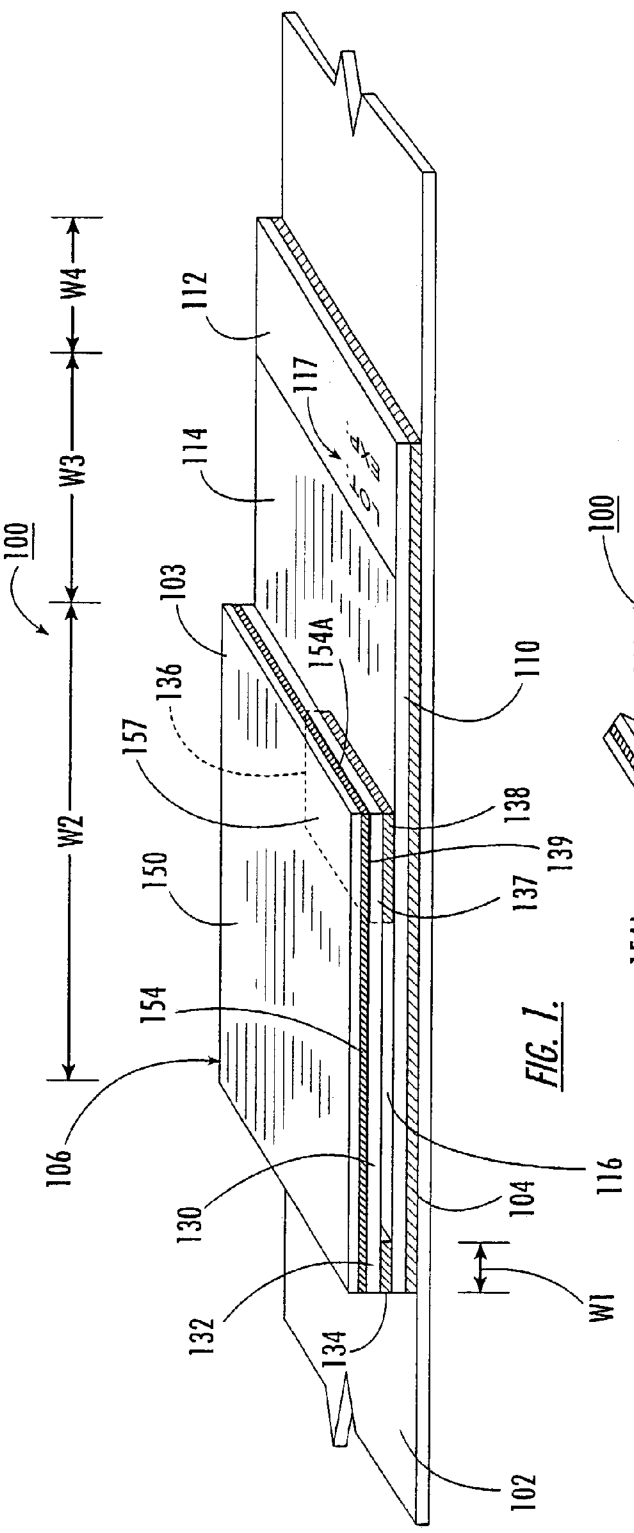
FIG. 1 is a perspective view of a label according to a first embodiment of the present invention disposed on a release liner and in a closed position.
Figure 2:
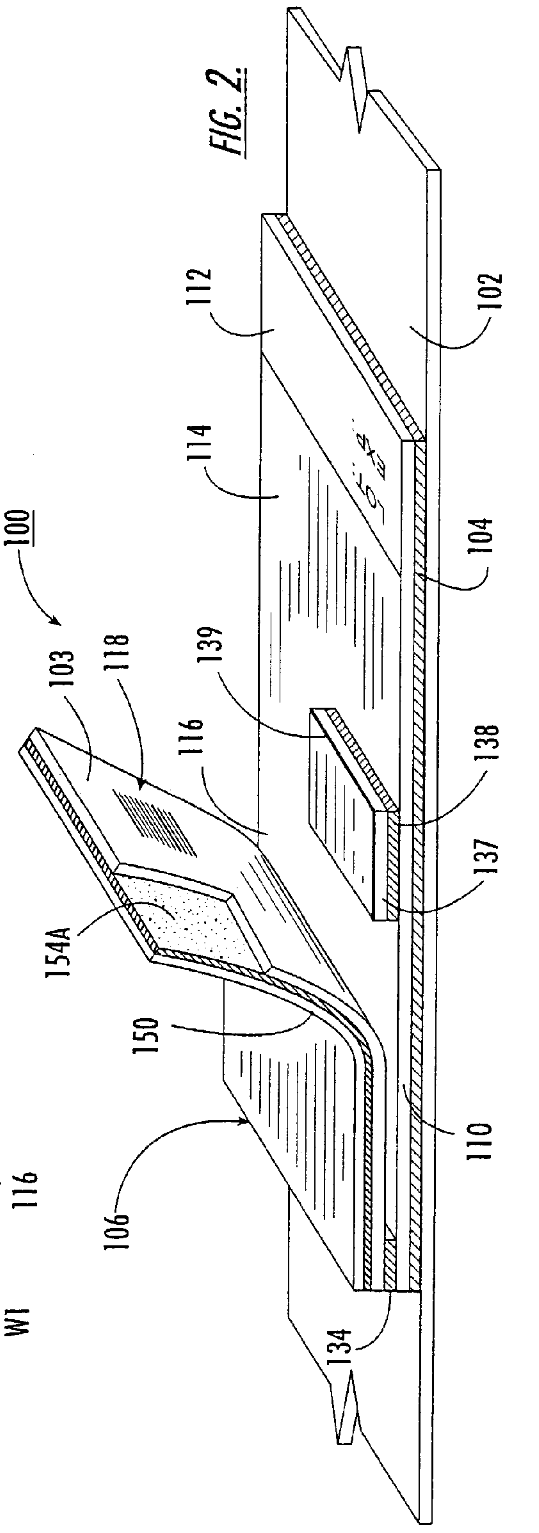
FIG. 2 is a perspective view of the label of FIG. 1 disposed on the release liner and in an open position.

With reference to FIG. 1, a label according to the present invention is shown therein disposed on a release liner 102 and generally designated 100. The label 100 includes a base label 110 releasably adhered to the release liner 102 by a pressure-sensitive base adhesive 104. A top panel 130 overlies a portion of the base label 110 and has a portion 132 secured to the base label 110 by a strip of adhesive 134. The strip of adhesive 134 preferably extends across the full width of the label 100 and permanently secures the top panel 130 to the base label 110 to form a hinge 106. Preferably, the adhesive strip 134 has a width W1 of between about ⅛ and ½ inch, and more preferably of about ¼ inch.

A die cut 136 is formed in the top panel 130 and defines a tab 137. The tab 137 is permanently adhered to the upper surface of the base label 110 by a pressure-sensitive adhesive 138. A release varnish 139 coats the upper surface of the tab 137.

A laminate cover 150 overlies the top panel 130 and is adhered thereto by a laminate adhesive 154. Preferably, the laminate cover 150 and the laminate adhesive 154 are co-extensive with the top panel 130. A portion 157 of the laminate cover 150 is releasably adhered to the varnish coated upper surface of the tab 137 by a portion 154A of the laminate adhesive 154. The laminate cover 150 is preferably formed of a 1.5 mil polypropylene film. The laminate cover 150 is preferably transparent, but may be opaque.

The top panel 130 and the laminate cover 150 overlie a covered portion 116 of the base label 110. A printable portion 112 of the base label 110 is disposed adjacent the edge of the base label 110 opposite the top panel 130. The upper surface of the portion 112 is preferably formed or prepared so as to be easily printable and is not varnished. An intermediate portion 114 of the base label 110 extends between the portions 112 and 116. Preferably, the portions 114 and 116 are coated with a varnish. Preferably, the width W2 of the portion 116 is about the same as the sum of the widths W3 and W4 of the portions 114 and 112. Preferably, the width W4 is about ½ inch. Preferably and as illustrated, only the portion 132 and the tab 137 are adhered to the upper surface of the base label 110 so that an adhesive-free region is defined between the top panel 130 and the base label 110 from the adhesive strip 134 to the adhesive 138.

Suitable indicia may be printed on the top and bottom surfaces of the base label 110, the top panel 130 and the laminate cover 150. Suitable indicia 117 such as "lot:" and "exp:" prompts may be printed on the portion 112. The portion 112 is particularly well suited for imprinting variable indicia such as a lot number and an expiration date.

The base label 110 and the top panel 130 are preferably formed of a conventional paper or film facestock. Suitable varnishes for the varnish 139 on the upper surface of tab 137 include varnish product number L075 available from Paragon Inks of Boxburn, Scotland. The varnish on the upper surfaces of the portions 114, 116 is preferably a water-based varnish having weaker release characteristics (i.e., provides less releasability) than the varnish 139. Preferably, the portions of the base label upper surface beneath the adhesive strip 134 and the adhesive patch 138 are not coated with varnish. However, if a varnish of sufficient weakness is used, these portions may also be varnish coated.

The adhesives 134, 138 may be different from the laminate adhesive 154. This allows the adhesives to be better selected for their respective functions. The laminate adhesive may be chosen to provide the desired release and hold characteristics to allow for opening and closing of the label 100 (as discussed below) while the adhesives 134, 138 may be selected to ensure the desired permanent securement between the panels 110, 130 and strength of the hinge 106. The ability to use different adhesives 134, 138 and 154 allows for greater flexibility in selecting the materials of the components that these adhesives engage as well. Preferably, the adhesive 134 and the adhesive 138 are more aggressive adhesives than the laminate adhesive 154. Suitable laminate adhesives 154 include emulsion acrylic adhesives. Suitable combined laminate/laminate adhesive materials include product number 505 from Adhesive Coated Products of Troy, Ohio. Suitable adhesives for the adhesives 134 and 138 include hot melt permanent pressure-sensitive adhesives such as product number HL2203X available from H. B. Fuller Co. of Minneapolis, Minn.

The label 100 may be used in the following manner. The label 100 may be applied to a suitable substrate such as a container using any suitable automatic or manual labeling equipment such that the label 100 is adhered to the substrate by the base adhesive 104. When the user wishes to access the information on the inside of the label 100, the user may grasp the corner or pull tab 103 of the combined top panel 130 and laminate cover 150 adjacent the tab 137. The user may then pull the corner 103 toward the hinge 106 (as illustrated from right to left), thereby causing the laminate adhesive portion 154A to peel away from the varnish coated tab 137. The underside of the top panel 130 preferably includes printed indicia 118 such as a bar code. The top panel 130 may be repeatedly opened and closed by rejoining the adhesive portion 154A with the tab 137. The area of adhesive 154A exposed upon opening the label 100 may be limited to that needed to ensure reliable closure of the label.

Figure 5:
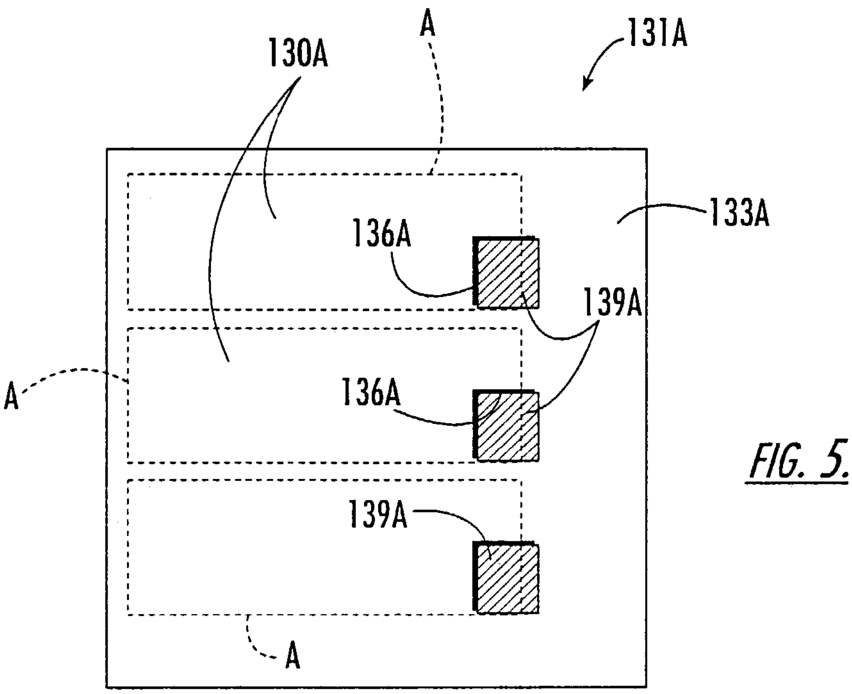
FIG. 5 is a top view of a sheet for forming the label of FIG. 1.

According to the first method for forming the label 100, a plurality of sheets 131A (see FIG. 5) are provided. The sheets 131A may be formed on a conventional printing press. A web of paper or film is unwound and indicia corresponding to the indicia on the upper and lower surfaces of the top panel 130 are printed thereon. The printing process employed may be flexography, UV flexo, rotary letterpress, conventional offset, digital offset, hot stamping, silkscreen or gravure. Release varnish patches 139A are printed on the upper surface of the web in locations corresponding to the tabs 137. The web is diecut to form cut lines 136A corresponding to the cut line 136. The web is thereafter diecut into individual sheets 131A, each of which includes a waste portion 133A and portions 130A generally corresponding to the top panels 130.

Figure 3:
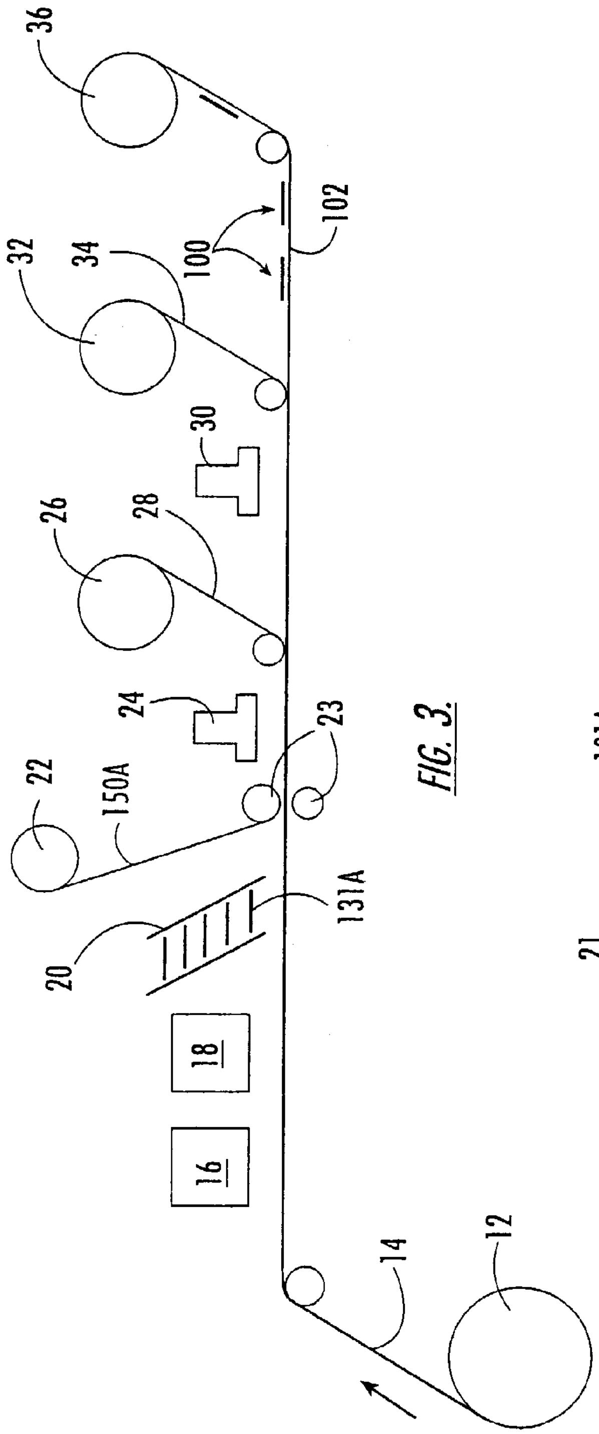
FIG. 3 is a schematic diagram of an apparatus for forming the label of FIG. 1.

With reference to FIG. 3, an apparatus 10 for forming labels 100 using the sheets 131A is shown schematically therein. A web 14 is unwound from an unwind stand 12. The web 14 includes the release liner 102 and a facestock web 110A (see FIG. 4) corresponding to the base label 110 adhered to the release liner 102 by an adhesive 104A corresponding to the adhesive 104. Desired indicia are printed on the web 110A by a suitable printing station 16. The printing process employed may be, for example, flexography, UV flexo, rotary letterpress, conventional offset, digital offset, hot stamping, silkscreen or gravure. The print station 16 or an additional print station may also print a conventional water base or UV varnish on the upper surface of the web 110A.

A series of alternating adhesive strips 134A and 138A (see FIG. 4) are printed on the tipper surface of the web 110A by an adhesive print station 18. The adhesive strips 134A correspond to the adhesive strip 134 and the adhesive strips 138A correspond to the adhesive patch 138. The adhesive patches 138A do not extend fully across the web 110A. Additional adhesive may be applied to the perimeter of the sheets 131A along the web length. The adhesive print station 18 is preferably a flexographic printing press such as a Flexocoat adhesive printing apparatus available from GRE International of Switzerland.

A sheet applicator 20 applies a series of the sheets 131A to the upper surface of the web 110A. The sheet applicator may be, for example, an Onserter feeding device, available from Longford Equipment of Toronto, Ontario. The sheets 131A are applied in seriated and imbricated relation such that the overlapping portions 21 of the respective sheets 131A overlie portions of the respective immediately upstream sheets 131A. Preferably, the amount of overlap is between about ⅛ and 3/16 inch. Each applied sheet 131A adheres to a respective adhesive strip 134A and a respective adhesive strip 138A.

Figure 4:
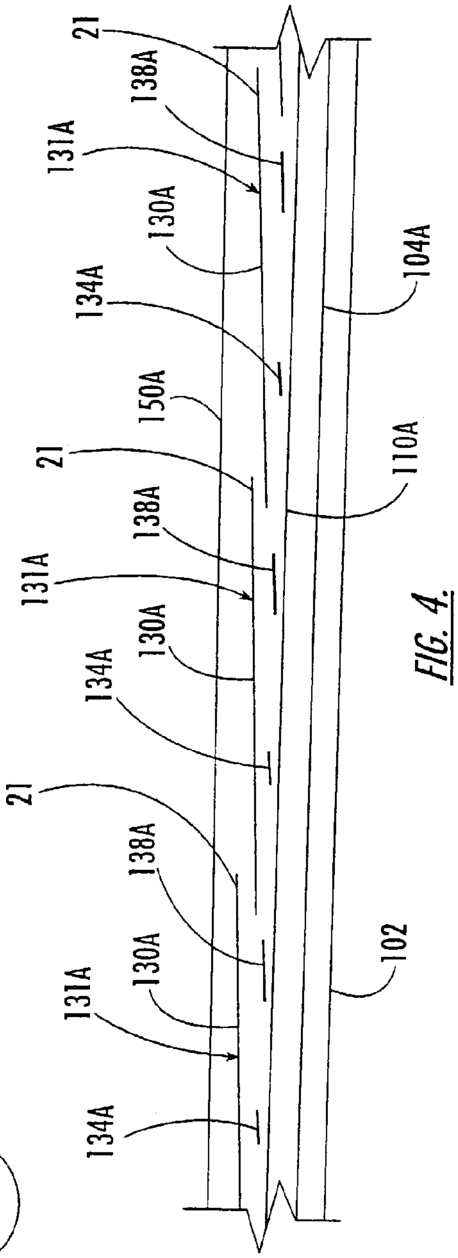
FIG. 4 is a schematic side view of an intermediate construction formed by the apparatus of FIG. 3.

Thereafter, a laminate web 150A corresponding to the laminate cover 150 is unwound from an unwind stand 22 and married to the web 14 and sheets 131A by nip rollers 23 to form the construction as shown in FIG. 4. A die cutter 24 cuts through the overlaminate web 150A and the individual sheets 131A down to, but not through, the web 110A to form cut lines A (see FIG. 5). The cut lines A formed by the die cutter 24 define the laminate cover 150 and the top panel 130 as shown in FIG. 1 or may be slightly larger. A waste matrix 28 including the waste portions 133A of the sheets 131A, the overlaminate web 150A and the adhesives 134A and 138A outside of the laminate covers 150 and the top panels 130 is taken up on a winding stand 26.

A further die cutter 30 forms a die cut down through the web 110A to the release liner 102 to form the periphery of the finished labels 100. A waste matrix 34 including the portions of the overlaminate web 150A, the base web 110A and the adhesive 104A outside of the labels 100 is taken up on a winding stand 32. The finished labels 100 disposed on the release liner 102 may thereafter be wound onto a winding stand 36. Optionally, the release liner maybe slit to provide side by side webs.

Notably, as a result of the overlapping relation of the sheets 131A and the small amount or absence of adhesive between the waste portions of the sheets 131A and the web 110A, the waste matrix 28 may be easily and reliably removed. However, the portions 130A of the sheets 131A which form parts of the finished labels 100 remain anchored to the web 110A by the adhesive strips 134 (which are formed from the adhesive strips 134A) and the adhesive patches 138 (which are formed from the adhesive patches 138A). Preferably, the die cutter 24 cuts the sheets 131A and the overlaminate web 150A to a size slightly larger than the corresponding dimensions of the top panel 130 and the laminate cover 150. The die cutter 30 cuts these elements to their ultimate dimensions on the three external edges.

Figure 6:
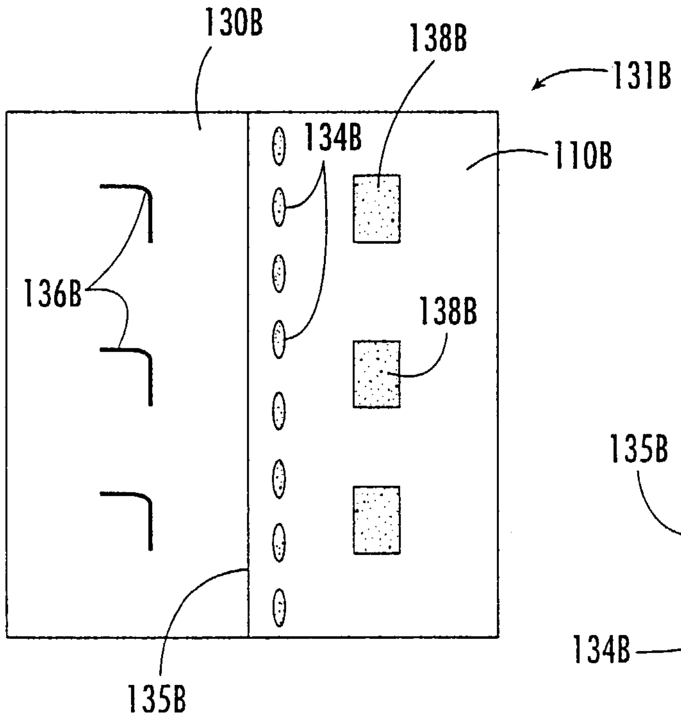
FIG. 6 is a top view of an alternative sheet for forming the label of FIG. 1.
Figure 7:
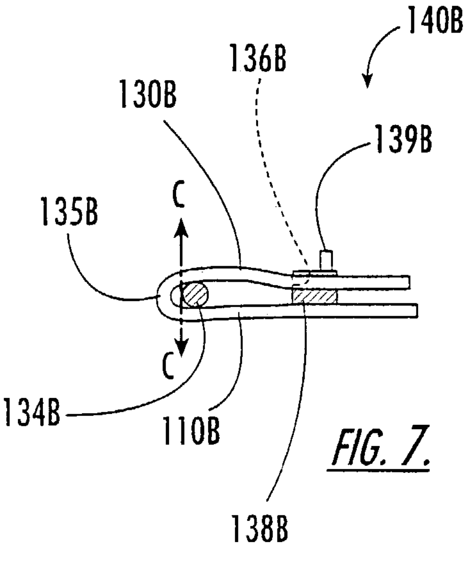
FIG. 7 is a side view of a leaflet for forming the label of FIG. 1 and formed from the sheet of FIG. 6.

With reference to FIGS. 6 and 7, the labels 100 may be formed using folded leaflets 140B, as shown in FIG. 7, in place of flat sheets 131A. The leaflet 140B is formed from a sheet 131B (see FIG. 6) which may be formed in a manner similar to that of the sheet 131A. The sheet 131B includes J-shaped cuts 136B formed therein. A continuous strip or dots of adhesive 134B corresponding to the adhesive strips 134 are applied along the sheet 131B. Adhesive patches 138B are applied to the sheet 131B in locations corresponding to the adhesive patches 138. Varnish patches 139B (see FIG. 7) are printed on the opposite side of the sheet 131B adjacent the cut lines 136B and in locations corresponding to the varnish 139. The sheet 131B is folded along a fold 135B to divide the sheet 131B into a top panel 130B corresponding to the top panels 130 and a bottom panel 110B corresponding to the base labels 110. The adhesive 134B adheres the panels 130B and 110B adjacent the fold line 135B.

The labels 100 may be formed according to the second method using the leaflet 140B and an apparatus similar to the apparatus 10. In place of the composite web 14, an adhesive-coated release liner is supplied (the adhesive coating corresponding to the adhesive 104). Alternatively, a silicone coated release liner may be provided and an adhesive applicator such as a GRE International Flexocoat print station may apply a pattern of pressure-sensitive hot melt adhesive to the release liner.

Printing steps corresponding to the printing steps of the printing stations 16 and 18 are executed on the sheet 131B prior to folding the sheet to form the leaflet 140B, and the printing stations 16, 18 may, therefore, be eliminated in this method. The leaflets 140B are applied by the leaflet applicator 20, preferably in overlapping relation. The overlaminate web 150A is applied over the release liner and the leaflets 140B. Thereafter, the leaflets 140B are cut in the same manner as described above (the bottom panels 110B corresponding to the base web 110A) except that a cut line C—C is also formed through the bottom panel 110B and the top panel 130B adjacent the fold 135B of each leaflet 140B and across the web to sever the panels 110B and 130B. In this case, the die cutter 24 is preferably a "suck and blow" type die cutter.

Figure 8:
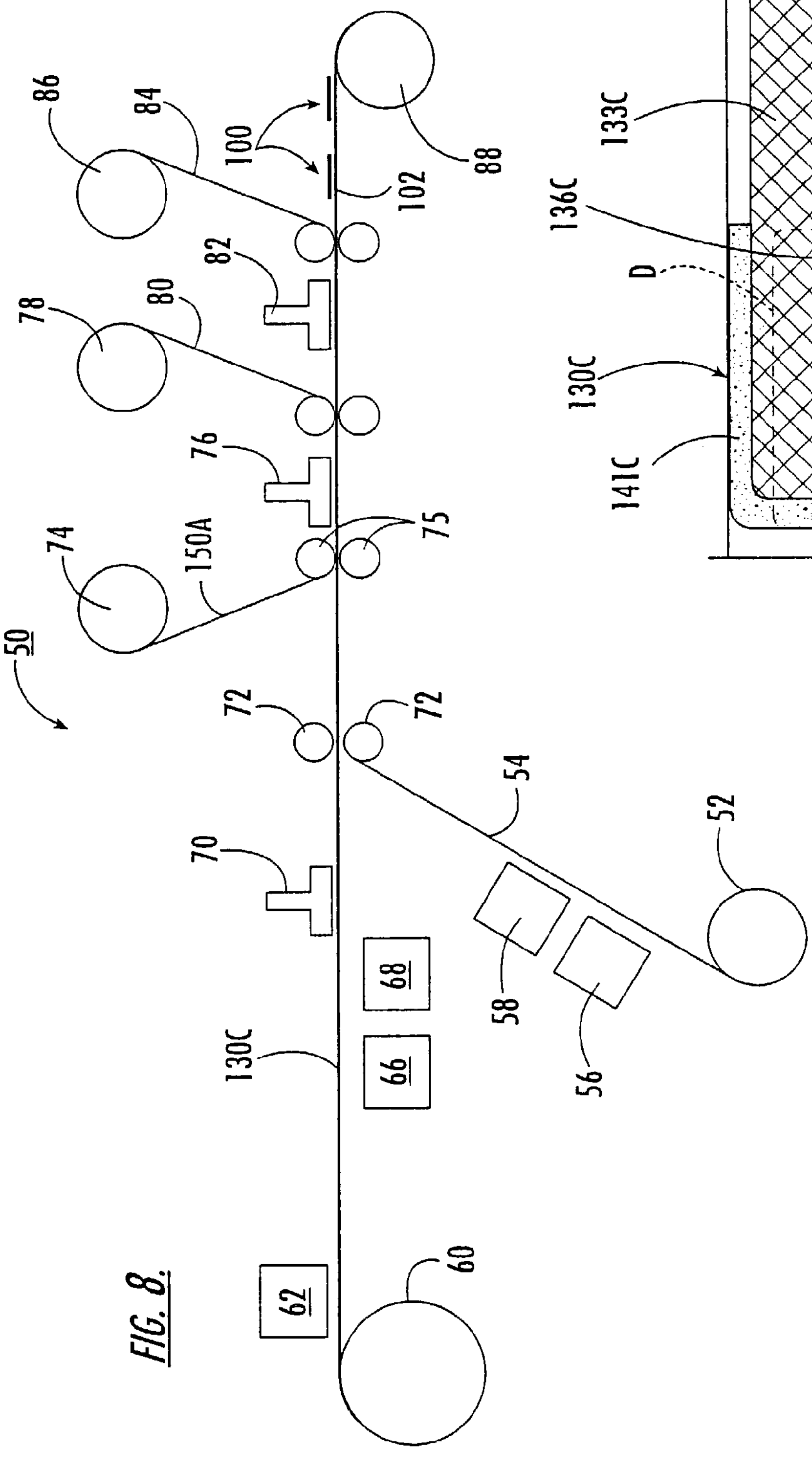
FIG. 8 is a schematic diagram of a further apparatus for forming the label of FIG. 1.

With reference to FIG. 8, an apparatus 50 for forming labels 100 according to a further method is shown therein. A composite web 54 corresponding to the web 14 is supplied from an unwinding station 52 and suitable indicia and varnish are printed on its upper surface by print stations 56 and 58 corresponding to the print stations 16 and 18, respectively. A second web 130C is supplied from an unwind station 60. Suitable indicia may be printed on either or both sides of the web 130C by a print station 62.

Figure 9:
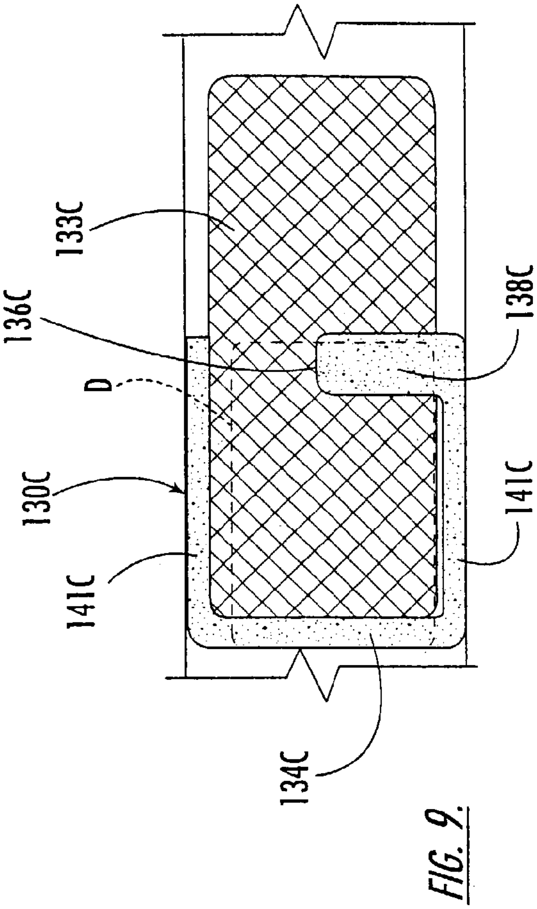
FIG. 9 is a bottom view of an intermediate construction formed by the apparatus of FIG. 8.

An adhesive applicator 66 applies adhesive to the undersurface of the web 130C. The adhesive applicator 66 may fully coat the web 130C with adhesive. Alternatively, the web 130C may be pre-coated with a layer of adhesive (eg., the web 130C may be a commercially available self-adhesive face stock). If the web 103C is fully coated with adhesive by the applicator 66 or by pre-coating, an adhesive deadener applicator 68 will apply a pattern of adhesive deadener to the layer of adhesive on the undersurface of the web 130C. With reference to FIG. 9, which shows the lower face of the web 130C following the station 68, the station 68 applies the deadener such that a deadened adhesive region 133C on the lower face of the web is substantially surrounded by active adhesive portions 141C, 134C, 138C. The adhesive portion 134C corresponds to the adhesive strip 134. The adhesive portion 138C corresponds to the adhesive patch 138. The adhesive portion 141C helps to hold the intermediate construction together to facilitate processing, in particular during the cutting and waste stripping steps. Suitable deadeners include Product 800 available from Radcure of Fairfield, N.J.

Alternatively, the adhesive print station 66 may apply the adhesive in a pattern corresponding to the pattern of active adhesive as shown in FIG. 9 but such that the region 133C remains free of adhesive. Suitable adhesive applicators for this purpose include a FlexoCoat PrintCoat Pattern Applicator, model number HM 410, available from FlexoCoat International, Inc. In this case, the adhesive deadener applicator 68 would not be used.

As a further alternative, the adhesive corresponding to the adhesives 134 and 138 may be applied to the upper surface of the web 54 rather than to the lower surface of the web 130C. Similarly, the upper surface of the web 54 may be fully coated with adhesive and adhesive deadener applied to form the adhesive portions corresponding to the adhesives 134 and 138.

A die cutter 70 forms a J-shaped die cut 136C (see FIG. 9) through the web 130C. The web 130C is thereafter married with the web 54 by nip rollers 72. The overlaminate web 150A is supplied from an unwind stand 74 and married to the combined webs 54, 130C by nip rollers 75. A die cutter 76 cuts down through the overlaminate web 150A and the web 130C as far as, but not through, the web 54 to form the cut line D as shown in FIG. 6. A waste matrix 80 including those portions of the web 130C and the overlaminate web 150A outside of the cut line D is taken up on a reel 78. A die cutter 82 thereafter forms the outer periphery of the label 100. A waste matrix 84 including those portions of the web 54 outside of the label 100 is taken up on a reel 86. The labels 100 and the release liner 102 may thereafter be taken up on a roll 88.

Optionally, in each of the alternative methods described above with regard to the apparatus 50, each of the printing, cutting and, if applicable, adhesive and adhesive deadener steps executed on the web 130C prior to the nip rollers 72 may be executed and the web 130C thereafter wound onto a roll. The roll would then be transferred to a second unwind stand and unwound to the nip rollers 72.

Figure 10:
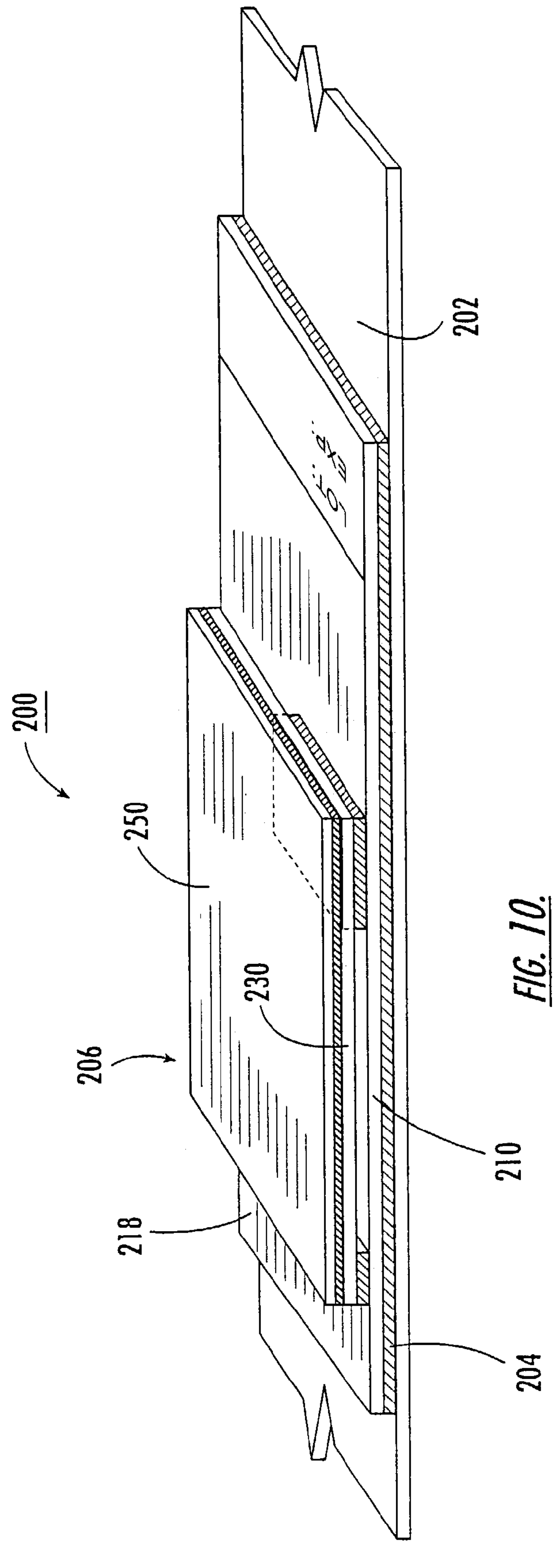
FIG. 10 is a perspective view of a label according to a further embodiment of the present invention disposed on a release liner.

With reference to FIG. 10, a label 200 according to a further embodiment of the present invention is shown therein disposed on a release liner 202. The label 200 corresponds to the label 100 except that the base label 210 thereof includes an extended portion 218 extending leftwardly beyond the edges of the laminate cover 250 and the top panel 230 adjacent the hinge 206. The base label portion 218 is coated on its undersurface by the base adhesive 204. The label 200 may be employed where it is desired to provide additional printable surface area on the base label. The label 200 may be formed using each of the above-described methods with suitable modifications as will be readily apparent to those or ordinary skill in the art upon reading the description herein.

Figure 11:
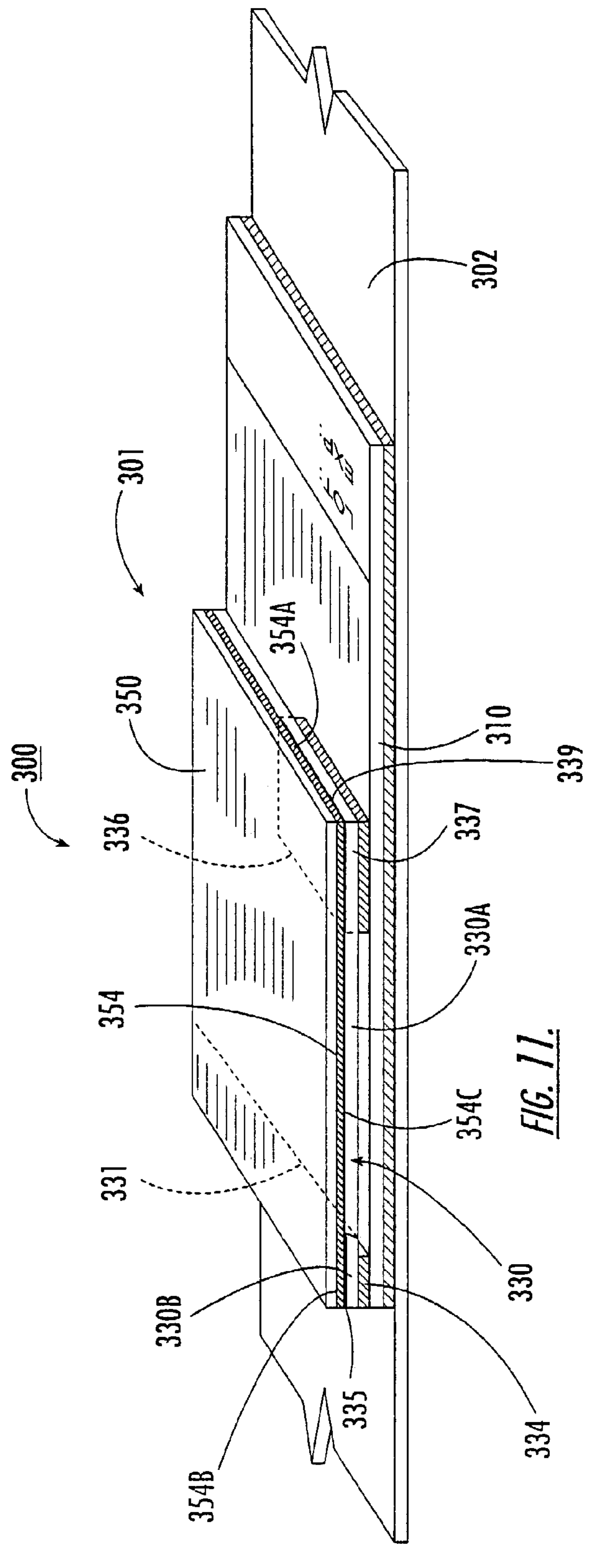
FIG. 11 is a perspective view of a label according to a further embodiment of the present invention disposed on a release liner.

With reference to FIG. 11, a label 300 according to a further embodiment of the present invention is shown therein disposed on a release liner 302. The label 300 corresponds to the label 100 except as follows. In addition to a cut line 336 (which defines a tab 337), a cut line 331 is formed through the top panel 330 so that the top panel 330 is divided into a marginal strip 330B, a central portion 330A, and a tab 337. The upper surface of the tab 337 is coated with a release varnish 339 corresponding to the varnish 139. The upper surface of the portion 330B is coated with a varnish 335, preferably of the type described above with regard to the varnish 139.

Figure 12:
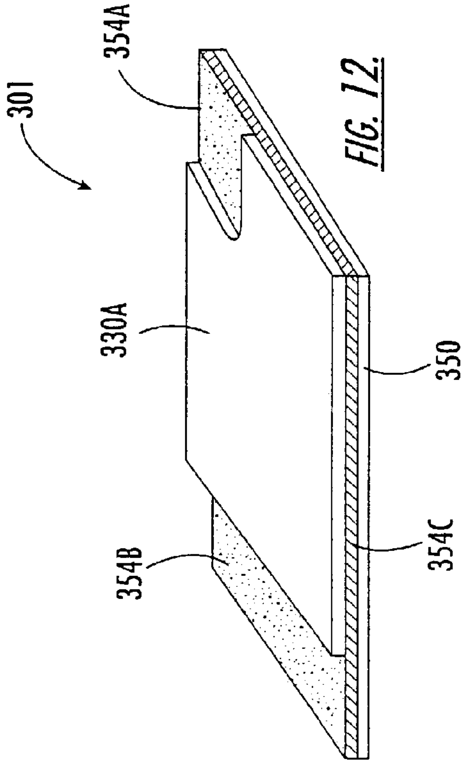
FIG. 12 is a bottom, perspective view of a secondary label forming a part of the label of FIG. 11.

The label 300 may be used in the same manner as described above with regard to the label 100. Additionally, the user may remove a secondary label 301 forming a part of the label 300 in the following manner. After the user has lifted the laminate cover 350 and the top panel 330, the user may continue pulling these elements leftward so that the laminate adhesive portion 354B of the laminate adhesive 354 which adheres the laminate cover 350 to the top panel portion 330B peels away from the varnish coated upper surface of the portion 330B. The portion 330B is adhered to the base label 310 by the adhesive strip 334 and therefore remains with the article. Similarly, in the manner described above, the tab 337 remains secured to the base label 310. The central top panel portion 330A, which is permanently secured to the laminate cover 350 by the laminate adhesive portion 354C, is removed with the laminate cover 350. Thereafter, the secondary label 301 as shown in FIG. 12 will have exposed adhesive portions 354A and 354B. The user may thereafter readhere the secondary label 301 to the label 300 or to a further substrate by means of the adhesive portions 354A and 354B.

The label 300 may be employed where it is desired to provide additional printable surface area on the base label. The label 300 may be formed using each of the above-described methods with suitable modifications as will be readily apparent to those of ordinary skill in the art upon reading the description herein.

Figure 13:
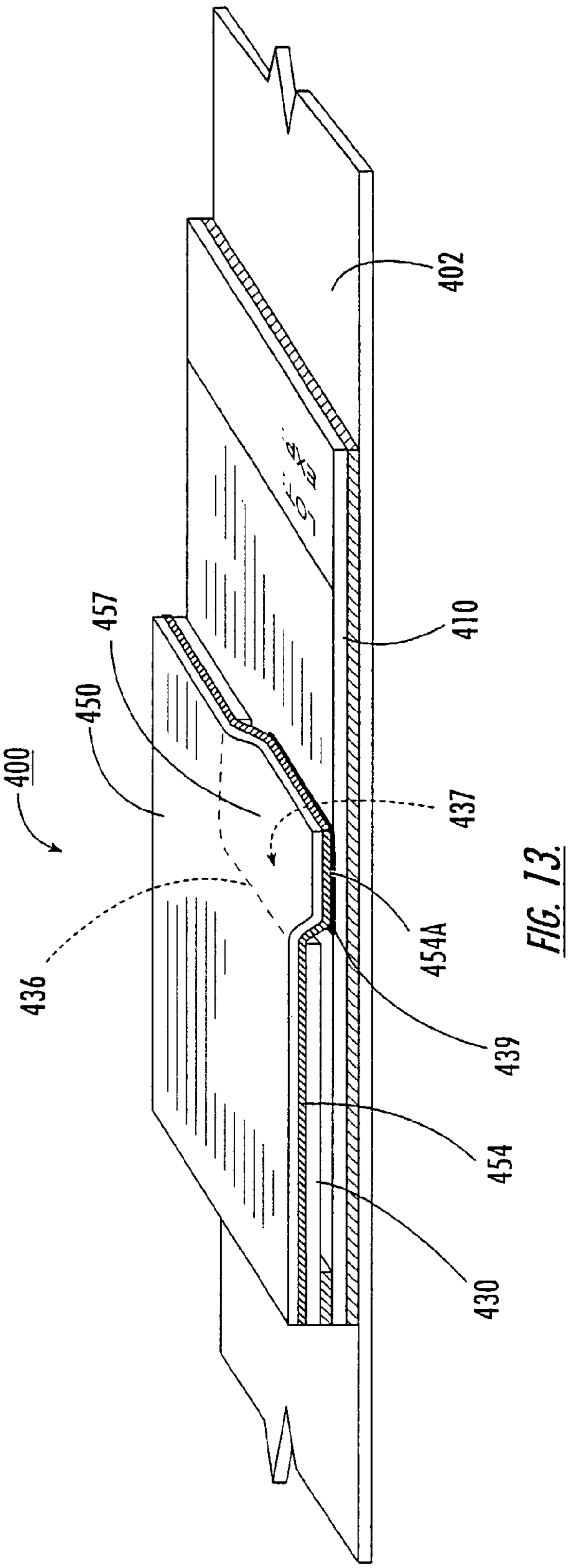
FIG. 13 is a perspective view of a label according to a further embodiment of the present invention disposed on a release liner.

With reference to FIG. 13, a label 400 according to a further embodiment of the present invention is shown therein disposed on a release liner 402. The label 400 corresponds to the label 100 except with regard to the construction of the top panel and the manner in which the label 400 is held in the closed position. The top panel 430 of the label 400 is formed with a peripheral cut out 437 defined by a peripheral edge 436. A portion 457 of the laminate cover 450 extending beyond the edge 436 is directly adhered to the upper surface of the base label 410 by a portion 454A of the laminate adhesive 454. The engaged upper surface of the base label 410 is coated with a suitable release varnish patch 439 so that the laminate adhesive portion 454A may be peeled away from the base label 410 and resealed as desired. The varnish 439 may be of the type described above with regard to the varnish 139.

It will be appreciated that the label 400 may be modified to include various aspects as described above with regard to the labels 100, 200, 300. For example, the label 400 may be modified to include an extended base label portion corresponding to the extended base label portion 218. Similarly, the label 400 may be modified to include a removable secondary self-adhesive label corresponding to the secondary label 301.

Figure 14:
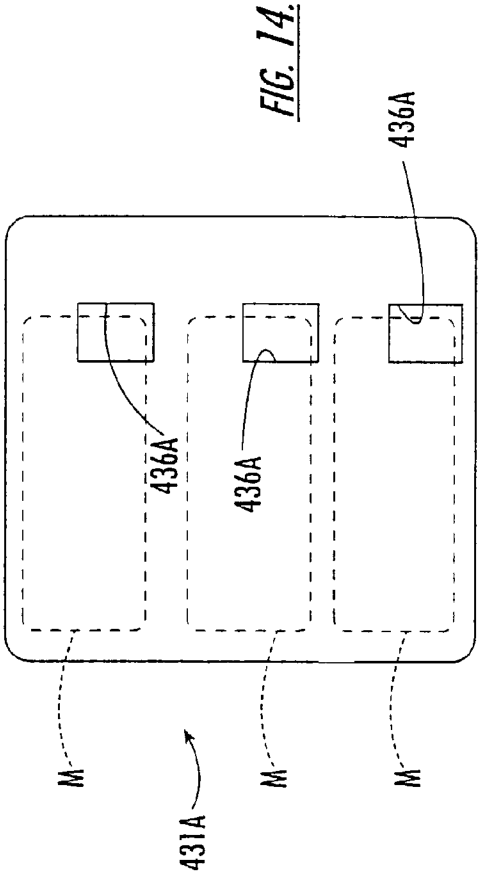
FIG. 14 is a top view of a sheet for forming the label of FIG. 13.

The label 400 may be formed using methods similar to each of the methods described above with regard to the label 100. More particularly, labels 400 may be formed using the first method as described above with reference to FIGS. 3–5 with the following modifications to the method. The sheet 131A is replaced with a sheet 431A (see FIG. 14) which has holes 436A pre-formed therein in place of the J-shaped cut lines 136A and the varnish regions 139A. In place of the adhesive patches 138A, release varnish is printed on the upper surface of the base web 110A in locations corresponding to the varnish patches 439 underlying the laminate cover portions 457. Additional portions of the base web may also be coated with the varnish. The die cutter 24 forms cut lines M corresponding to the cut lines A (see FIG. 5) and intersecting the holes 436A.

The label 400 may be formed using the second method as described above with regard to FIGS. 6 and 7 with the following modifications. The cut lines 136B in the sheet 131B are replaced with holes corresponding to the cut outs 437 and the adhesive patches 138B are replaced with regions of release varnish.

The labels 400 may be formed using the third method as described above with regard to FIGS. 8 and 9 with the following modifications. Rather than forming cut lines 136C, the die cutter 70 punches holes in the web 130C, the interior waste portions of which may be removed by a suction device or other suitable means. No adhesive regions corresponding to the adhesive portion 138C are printed on the lower face of the web. Accordingly, when the overlaminate web 150A is applied, portions thereof corresponding to the laminate portions 457 engage the web 54 through the holes in the web 130C.

Figure 15:
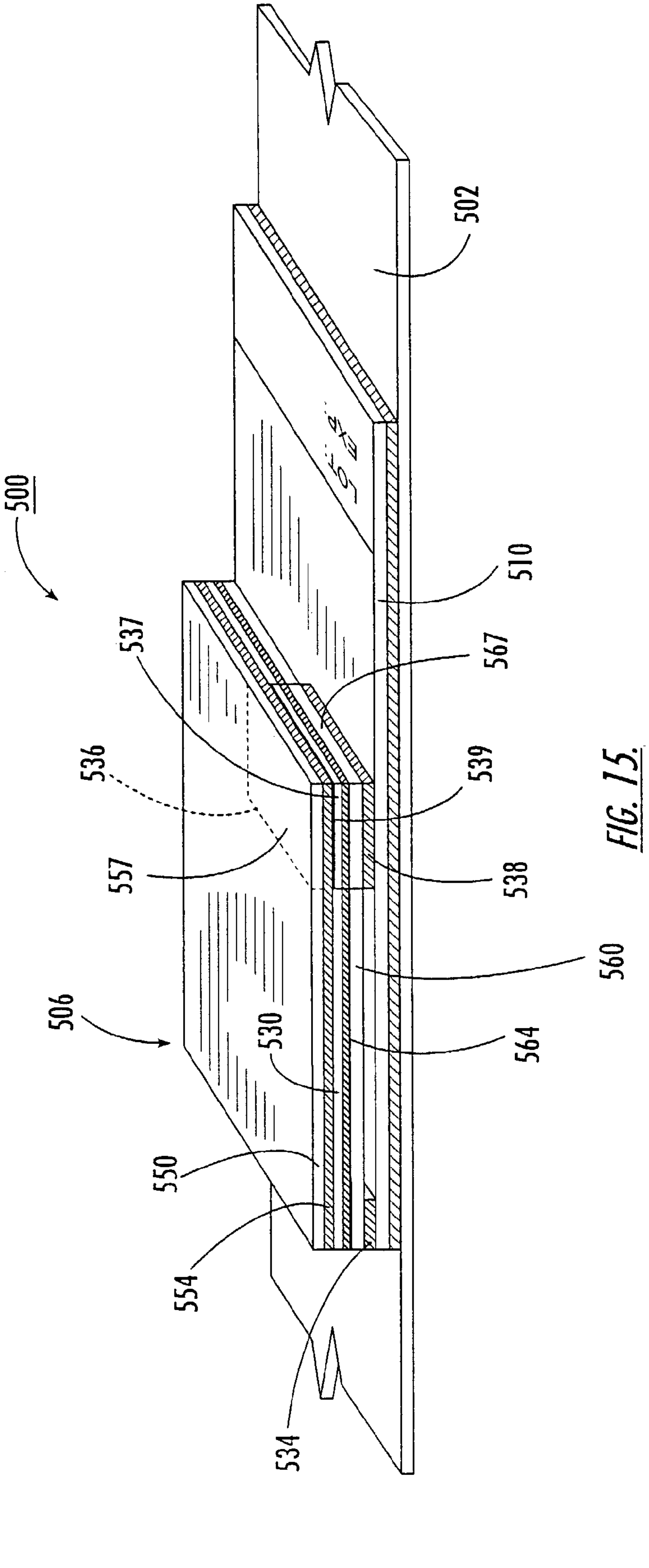
FIG. 15 is a perspective view of a label according to a further embodiment of the present invention disposed on a release liner.

With reference to FIG. 15, a label 500 according to a further embodiment of the present invention is shown therein disposed on a release liner 502. The label 500 corresponds to the label 100 except as follows.

A release liner panel 560 having a release coated (e.g., silicone coated) upper surface and a non-releasable lower surface is releasably adhered to the lower surface of the top panel 530 by a layer of intermediate adhesive 564. Preferably, the release liner panel 560, the adhesive 564, the top panel 530, the laminate cover 550 and the laminate adhesive 554 are all coextensive.

The release liner panel 560 is permanently adhered to the base label 510 by the adhesive strip 534 and the adhesive patch 538. A cut line 536 extends through the top panel 530 and the release liner panel 560 to define superimposed tabs 537, 567. A release varnish 539 coats the upper surface of the tab 537. A portion 557 of the laminate cover 550 is releasably adhered to the varnish 539 by the laminate adhesive 554.

In use, the user may open the label 500 in the same manner as the label 100, in which case the release liner panel 560 will fold up with the top panel 530 about the hinge 506 and the tabs 537 and 567 will remain secured to the base label 510. If desired, the user may also peel the laminate cover 550 and the top panel 530 away from the release liner panel 560. The adhesive 564 will remain on the lower surface of the panel 530.

According to certain embodiments, the adhesive 564 is selected such that it will remain tacky to allow the top panel 530 and the laminate cover 550 to be re-adhered to a second substrate or to the label 500. Alternatively, the adhesive 564 may be a fugitive adhesive so that it will be substantially non-tacky once the top panel 530 is peeled away. "Fugitive adhesives" are characterized in that they are operative to adhere two layers (in this case, the release liner panel 560 and the top panel 530) but, when the two layers are separated, the exposed adhesive 564 is substantially non-adherent. When the adhesive dries, the bond will remain strong enough to hold the layers together until the bond is broken by deliberately separating the layers. The adhesive is then dry and tackless (i.e., at least nontacky to the touch) and will not adhere to anything or unduly collect dirt and debris. The particular characteristics of the adhesive will depend on the materials chosen for the layers to be bonded as well as the required performance parameters (e.g., the desired amount of force required to break the bond between the layers). Suitable adhesives include WB 4738 available from H.B. Fuller of St. Paul, Minn. An alternative suitable adhesive is described in U.S. Pat. No. 4,479,838 to Dunsirn et al., the disclosure of which is incorporated herein by reference. It is particularly contemplated that the top panel 530 may be printed with coupon or proof of purchase indicia.

The label 500 may be modified to omit the varnish 539, in which case, when the label is folded open, the entirety of the top panel 530 will lift with the laminate cover 550 and the top panel 530 will peel away from the tab 537. The label 500 may also be modified to include a cut away corresponding to the cut away 437 in place of the tabs 537, 567.

The label 500 and the modified embodiments as described above may be formed using the methods and apparatus described above with suitable modifications. In each case, the web from which the top panel 130, 230, 330, 430 is formed is replaced with a two-ply web including a facestock corresponding to the top panel 530, an adhesive corresponding to the adhesive 564 and a release liner corresponding to the release liner panel 560. Thereafter, the two-ply web may be processed in the same manner as the single-ply web of the aforementioned methods.

Preferably, as illustrated and described, the top panels 130, 230, 330, 430 and 530 are mutually discrete members from the base labels 110, 210, 310, 410 and 510, respectively. That is, the top panel and the base label do not include a continuous sheet or strip that forms a part of both the top panel and the base label (e.g., with a fold formed in the strip between the top panel and the base label). However, labels according to aspects of the present invention may include a top panel and a base label formed of a folded leaflet. In this case, the fold is preferably located along the edge between the base and top panels opposite the closure tab, and the hinge adhesive strip (e.g., adhesive strip 134, 344, 534) may or may not be omitted.

Preferably, and as illustrated, the laminate covers and the top panels of the labels are substantially coextensive. Additionally, the base labels may be coextensive with the top panels and the laminate covers. In this case, the cutting steps for forming the base label and for forming the top panel may be merged into a single diecut step. Lot and expiration information or the like may be printed on the top panel and/or the laminate cover over the hinge adhesive strip (e.g., the adhesive strip 134).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for forming a label, said method including:

a) providing a release liner and a base web releasably secured to the release liner by a base adhesive coating an inner surface of the base web;

b) applying a hinge adhesive to an outer surface of the base web;

c) applying a top sheet to the outer surface of the base web such that a portion of the top sheet is secured to the base web by the hinge adhesive, the top sheet including a tab portion;

d) applying a self-adhesive laminate web over the base web and the top sheet;

e) cutting through each of the laminate web, the top sheet and the base web to form the label, the label including a laminate cover formed from the laminate web, a top panel formed from the top sheet, and a base label formed from the base web, wherein at least the laminate cover and the top panel are substantially coextensive;

f) applying a tab adhesive patch to the outer surface of the base web such that the tab adhesive patch engages an inner surface of the tab portion when the top sheet is applied to the base web; and g) applying a release varnish to an outer surface of the tab portion.

2. A method for forming a label, said method including:

a) providing a release liner and a base web releasably secured to the release liner by a base adhesive coating an inner surface of the base web;

b) applying a hinge adhesive to an outer surface of the base web;

c) applying a top sheet to the outer surface of the base web such that a portion of the top sheet is secured to the base web by the hinge adhesive;

d) applying a self-adhesive laminate web over the base web and the top sheet;

e) cutting through each of the laminate web, the top sheet and the base web to form the label, the label including a laminate cover formed from the laminate web, a top panel formed from the top sheet, and a base label formed from the base web, wherein at least the laminate cover and the top panel are substantially coextensive; and f) applying a plurality of the top sheets to the base label in seriated and imbricated relation.

3. A method for forming a label, said method including:

a) providing a release liner and a base web releasably secured to the release liner by a base adhesive coating an inner surface of the base web;

b) applying a hinge adhesive to an outer surface of the base web;

c) applying a top sheet to the outer surface of the base web such that a portion of the top sheet is secured to the base web by the hinge adhesive;

d) applying a self-adhesive laminate web over the base web and the top sheet; and e) cutting through each of the laminate web, the top sheet and the base web to form the label, the label including a laminate cover formed from the laminate web, a top panel formed from the top sheet, and a base label formed from the base web, wherein at least the laminate cover and the top panel are substantially coextensive; and f) forming a tab cut in the top sheet before applying the top sheet to the base web, wherein the tab cut and the cut formed in said step of cutting through each of the laminate web, the top sheet and the base web to form the label together define a tab that is interposed between the laminate cover and the base label and is separable from the top panel.

4. A method for forming a label, said method including:

a) providing a release liner having a base adhesive on an outer surface thereof;

b) providing a leaflet assembly including a top panel and a bottom panel joined to the top panel along a fold, the leaflet assembly further including a hinge adhesive coating respective inner surfaces of the top panel and the bottom panel adjacent the fold and securing the top and bottom panels to one another;

c) applying the leaflet assembly to the release liner such that the bottom panel is releasably secured to the release liner by the base adhesive;

d) applying a self-adhesive laminate web over the leaflet assembly and the release liner; and e) cutting through each of the laminate web, the top panel and the bottom panel to form the label, wherein said step of cutting includes severing the fold from each of the top panel and the bottom panel.

5. The method of claim 4 including applying a tab adhesive patch to the inner surfaces of the top and bottom panels at a location spaced apart from the hinge adhesive.

6. The method of claim 4 including applying a release varnish to an outer surface of the top panel opposite the tab adhesive patch.

7. The method of claim 4 including forming a tab cut in the top panel before applying the leaflet assembly to the release liner, wherein the tab cut and the cut formed in said step of cutting through each of the laminate web, the top panel and the bottom panel to form the label together define a tab that is interposed between a laminate cover formed from the laminate web and the bottom panel and is separable from the top panel.

8. A method for forming a label, said method including:

a) providing a release liner and a base web releasably secured to the release liner by a base adhesive coating an inner surface of the base web;

b) providing a top web;

c) providing a pattern of active adhesive on at least one of an inner surface of the top web and an outer surface of the base web, the pattern of active adhesive including a hinge adhesive portion;

d) providing a self-adhesive laminate web;

e) marrying the release liner, the base web, the top web and the laminate web such that the top web is interposed between the base web and the laminate web;

f) cutting through each of the laminate web, the top web and the base web to form the label, the label including a laminate cover formed from the laminate web, a top panel formed from the top web, and a base label formed from the base web, wherein the hinge adhesive portion secures the top panel to the base label; and g) applying a release varnish to an outer surface of the top web.

9. The method of claim 8 including forming the pattern of active adhesive by deadening a layer of adhesive on at least one of the inner surface of the top web and the outer surface of the base web.

10. The method of claim 8 including applying the hinge adhesive portion to at least one of the inner surface of the top web and the outer surface of the base web.

11. The method of claim 8 wherein the pattern of active adhesive includes a tab adhesive patch spaced apart from the hinge adhesive portion.

12. The method of claim 8 including punching a hole in the top web before marrying the release liner, the base web, the top web and the laminate web.

13. A method for forming a label, said method including:

a) providing a release liner and a base web releasably secured to the release liner by a base adhesive coating an inner surface of the base web;

b) providing a top web;

c) providing a pattern of active adhesive on at least one of an inner surface of the top web and an outer surface of the base web, the pattern of active adhesive including a hinge adhesive portion;

d) providing a self-adhesive laminate web;

e) marrying the release liner, the base web, the top web and the laminate web such that the top web is interposed between the base web and the laminate web;

f) cutting through each of the laminate web, the top web and the base web to form the label, the label including a laminate cover formed from the laminate web, a top panel formed from the top web, and a base label formed from the base web, wherein the hinge adhesive portion secures the top panel to the base label; and g) forming a tab cut in the top web before marrying the release liner, the base web, the top web and the laminate web, wherein the tab cut and the cut formed in said step of cutting through each of the laminate web, the top web and the base web to form the label together define a tab that is interposed between the laminate cover and the base label and is separable from the top panel.

* * * * *